United States Patent [19]

Myers

[11] 3,856,660

[45] Dec. 24, 1974

[54] REFORMING PROCESS USING Pt-Ir-Ga CATALYST

[75] Inventor: John W. Myers, Bartlesville, Okla.

[73] Assignee: Phillips Petroleum Company, Bartlesville, Okla.

[22] Filed: Aug. 15, 1973

[21] Appl. No.: 388,599

Related U.S. Application Data

[62] Division of Ser. No. 190,288, Oct. 18, 1971, Pat. No. 3,789,024.

[52] U.S. Cl.................. 208/138, 208/139, 252/441, 252/466 PT
[51] Int. Cl............................................ C10g 35/06
[58] Field of Search ............ 208/138, 139; 252/441, 252/442, 464, 465, 466 PT

[56] References Cited

UNITED STATES PATENTS

| | | | |
|---|---|---|---|
| 2,814,599 | 11/1957 | Lefrancois et al.................. | 252/441 |
| 2,914,464 | 11/1959 | Burton et al....................... | 252/441 |
| 3,507,781 | 4/1970 | Spurlock et al............... | 252/466 PT |
| 3,554,902 | 1/1971 | Buss................................... | 252/442 |

Primary Examiner—Delbert E. Gantz
Assistant Examiner—S. Berger

[57] ABSTRACT

Reforming process comprising contacting naphtha and hydrogen with a catalyst comprising a refractory support promoted with platinum, iridium and gallium.

5 Claims, No Drawings

REFORMING PROCESS USING Pt-Ir-Ga CATALYST

This is a divisional application of my copending application having Ser. No. 190,288, filed Oct. 18, 1971, and now U.S. Pat. No. 3,789,024.

This invention relates to reforming hydrocarbons. In another aspect, this invention relates to platinum-type catalysts promoted with iridium and gallium. In yet another aspect, this invention relates to the conversion of hydrocarbons using the improved catalyst.

Platinum-type catalysts have come into commercial use in the conversion of hydrocarbons. Catalysts containing platinum have been used commercially for the reforming of naphthas. A well-known disadvantage of such catalysts and reforming processes, however, is their tendency to lose activity after a period of use at elevated temperatures. This period of use is particularly short when the catalyst is subjected to periodic regeneration by oxidation to remove carbonaceous deposits formed during hydrocarbon conversion processing. Most catalytic reforming processes operate at high reaction pressures in order to control coke deposition and catalyst deactivation. When reforming at low pressures, conventional catalysts rapidly foul and become deactivated, thereby preventing the reforming processes from having long operational life. Extensive research has therefore been developed to lower pressures utilized in reforming processes and catalysts for the use therein since the low pressure processes result in substantial increases in yield of gasoline products of high rating.

The problem is to find an inexpensive catalyst system for dehydrocyclization and naptha reforming which can be used at relatively low pressures and yet provide favorable reforming results and maintain long catalyst life. High temperatures could be used to overcome this deactivation problem but this would increase side reactions such as hydrocracking. The present invention provides an alternative catalyst which has an economic advantage over many of those known in the art.

Accordingly, an object of this invention is to provide an improved platinum-type catalyst. Another object of this invention is to increase the activity and selectivity of platinum-type catalysts for reforming. Yet another object of this invention is to provide an improved process for the reforming of naphthas. Other objects and aspects, as well as the several advantages of the invention, will be apparent to those skilled in the art upon reading the specification and the appended claims.

In accordance with the invention, refractory supported platinum-type catalysts are improved in activity and selectivity by incorporating therein a finite amount of iridium and gallium. Further in accordance with the invention, hydrocarbons are reformed by contacting with a supported platinum-type catalyst promoted with iridium and gallium which exhibits increased activity and selectivity for reforming reactions.

In accordance with a specific embodiment, alumina promoted with platinum, iridium and gallium converts n-heptane to benzene and toluene at low pressure with substantially complete conversion and high selectivity of the paraffin to aromatics. The catalysts of the invention consist of a small but finite amount of each of the elements platinum, iridium and gallium incorporated into a refractory support such as alumina. The catalyst compositions of the invention can contain from about 0.01 to about 5 weight percent of each of platinum, iridium and gallium with the remainder being a refractory support with the preferred amounts of the promoters being in the range of from about 0.05 to about 2 weight percent of each of platinum, iridium and gallium with the remainder being a refractory support such as alumina. Other support material can be selected from silica, zinc spinel, titania, charcoal, thoria, zirconia, pumice, kieselguhr, magnesia, silica-alumina with titania, silica-magnesia, and the like. Although other materials can be used as support, alumina, including both the gamma-alumina and the eta-alumina, is preferred.

Any conventional and convenient catalyst preparation mode can be used for preparing the catalysts of this invention. Impregnation of a suitable catalytic alumina is preferred. A choice of readily available soluble platinum, iridium and gallium compounds is generally limited, and compounds such as the halides or the chloroacids are generally used. After impregnation, the compositions are suitably dried and then activated by elevated temperatures, for example, 600°–1,200°F, preferably 800°–1,000°F, in air, hydrogen or inert gases. If desired, the catalyst can be further promoted for reforming applications through the addition of halogens to the feed stream or to the catalyst.

The catalysts of the invention are especially effective in the reactions involved in naphtha reforming including hydrogenation, dehydrocyclization, isomerization, and hydrogenation, and have exhibited increased activity and selectivity for the conversion, for example, of paraffins to aromatics. The catalysts of the invention are particularly applicable to the dehydrocyclization and reforming of hydrocarbons including acyclic and cyclic paraffins, particularly naphthenes and paraffins. The catalysts are particularly suitable for the reformation of paraffins containing from 6 or more carbon atoms per molecule including n-hexane, methyl hexane, n-heptane, dodecane, and the like. Some examples of the naphthenes which can be reformed with the catalysts are methylcyclopentane, cyclohexane, and the like. Some olefins can be present in the feedstock. The preferred feeds range from the $C_6$ to $C_{12}$ paraffins and $C_6$ to $C_{12}$ naphthenes. The catalysts can be employed for the reformation of mixtures of paraffins and naphthenes such as are obtained from the distillation of straight run or natural gasolines. Most often, refinery streams containing such materials and boiling in the range of from about 150°–400°F are used. Low sulfur containing feeds are generally preferred.

In utilizing the catalysts of this invention for the dehydrocyclization reforming of the foregoing hydrocarbons, the hydrocarbons to be reformed are contacted with the catalysts of the invention at a temperature, pressure, and flow rate of hydrocarbon feedstock in the presence of hydrogen to convert the hydrocarbon feedstock to the desired reformed product. The conditions employed will vary appreciably depending upon the hydrocarbon feedstock used. Generally, the temperature employed will be in the range of 600°–1,100°F, preferably 700°–1,050°F, in the presence of hydrogen. The hydrogen rate during reforming will ordinarily range from 0.5 to 20 mols of hydrogen per mol of hydrocarbon. The temperature to be employed in the reforming process will be determined largely by other operating conditions, that is, at a particular pressure, liquid hourly space velocity, and hydrogen-to-hydrocarbon ratio. The temperature utilized is normally determined by the desired octane number of the product to be produced, for example, higher octane numbers are achieved at higher temperatures within the operational limits set forth above.

The pressure in the reforming reaction zone for the purposes of the present invention is generally less than 600 psig. Preferably, the pressure will be at least 100 psig but less than 400 psig. The hydrocarbon feed rate ing each of these latter two temperature periods and the samples were analyzed to show extent of conversion and selectivity to aromatic products. The results of the last of such samplings, at a given number of hours on stream, are shown for each of the invention catalysts and for each of the comparison catalysts. These results are shown in the table below.

TABLE

Dehydrocyclization of n-Heptane[1]

| Run | Promoter, Weight % | Catalyst Age Hrs. | 895°F Conversion | Selectivity[2] | Catalyst Age Hrs. | 950°F Conversion | Selectivity[2] |
|---|---|---|---|---|---|---|---|
| 1 | 0.5 Pt | 103 | 62.5 | 48.1 | 108 | 95.4 | 54.2 |
| 2 | 0.5 Pt-0.3 Ga | 94 | 67.3 | 35.6 | 99 | 95.9 | 42.0 |
| 3 | 0.5 Pt-0.5 Ga | 82 | 87.3 | 30.4 | 87 | 100 | 41.4 |
| 4 | 0.5 Pt-0.3 Ir | 94 | 72.8 | 50.4 | 99 | 98.6 | 56.4 |
| 5 | 0.5 Pt-0.3 Ir-0.3 Ga | 103 | 89.7 | 46.6 | 108 | 100 | 55.6 |

[1] at 100 psig, 1.5 n-heptane LHSV, 7:1 $H_2$:heptane mol ratio.
[2] Selectivity to benzene and toluene.

for use in the present invention, i.e., the liquid hourly space velocity (LHSV) is in the range of 0.2 to 10, preferably 0.5 to 5 LHSV.

In utilizing the catalysts of the invention for reforming hydrocarbons, the reforming reaction can be carried out either batchwise or continuously, preferably the latter. In carrying out the process as a continuous one, it is to be understood that hydrogen and the effluent product can be separated and recycled. Although the catalyst is relatively long-lasting, occasional regeneration is required. The regeneration is carried out conveniently by first burning off carbon with a gas containing a low oxygen concentration and then repeating the activation procedure described above.

The following specific examples are intended to illustrate the advantages of the above-described catalyst of the invention.

EXAMPLE

Several catalysts were prepared by impregnating 12-20 mesh etaalumina with appropriate solution concentrations of chloroplatinic acid, gallium nitrate and iridium tetrachloride which yield final desired catalyst compositions. In those instances where more than one promoter was deposited on the alumina, a single solution containing all of the impregnants was used.

After impregnation each of the catalysts was dried at about 240°F, then calcined at 800°F in air for 2 hours. The catalysts were then charged into a fixed bed reactor and contacted with hydrogen at 900°F before being put on stream with the feed hydrocarbon.

Each of the catalysts was subjected to a reaction sequence in which its activity and selectivity for the conversion of n-heptane to benzene plus toluene was determined over a long period of catalyst aging. The sequence consisted of a number of cycles, each about 22 hours long. For most of the cycle the temperature of the reaction zone was maintained at about 925°F except for a 4 hour period at 895°F and another 4 hour period at 950°F. The reactor effluent was sampled dur- The table above demonstrates through the comparison of runs 2, 3 and 4 that the presence of gallium, like iridium, on a platinum-alumina catalyst substantially improves the conversion rate. However, it is further found that the presence of some iridium rather than gallium results in a better selectivity. Inventive run 5, when compared to the platinum-promoted run 1, the platinum-gallium-promoted runs 2 and 3, and the platinum-iridium run 4, illustrates the resulting high conversion and satisfactory selectivity when using a platinum-, iridium-, gallium-promoted catalyst.

Certain modifications of the invention will become apparent to those skilled in the art and the illustrated details disclosed are not to be construed as imposing unnecessary limitations on the invention.

I claim:

1. A process for the catalytic reforming of hydrocarbons which comprises contacting at reforming conditions naphtha and hydrogen with a catalyst having increased activity and selectivity comprising a refractory support promoted with from about 0.01-5 weight percent of platinum, iridium and gallium, respectively, and withdrawing a reformate rich in aromatics.

2. The process according to claim 1 wherein the reforming temperature ranges from 600°-1,100°F, the reforming pressure ranges from 100-600 psig, the hydrocarbon feed rate ranges from 0.2-10 LHSV, and the hydrogen ratio ranges from 0.5-20 mols of hydrogen per mol of hydrocarbon feed.

3. The process according to claim 1 wherein the naphtha comprises paraffins having from about 6 to about 12 carbon atoms per molecule.

4. The process according to claim 1 wherein the support is alumina and the amount of platinum, iridium and gallium present in the catalyst is in the range of 0.05-2 weight percent.

5. A process according to claim 4 wherein said naphtha comprises n-heptane and the reformate produced comprises benzene and toluene.

* * * * *